United States Patent Office 3,081,321
Patented Mar. 12, 1963

3,081,321
N-ACYLATION OF PARA AMINO PHENOL
David W. Young, Homewood, Ill., assignor, by mesne assignments, to Sinclair Research, Inc., New York, N.Y., a corporation of Delaware
No Drawing. Filed June 27, 1961, Ser. No. 119,840
3 Claims. (Cl. 260—404)

This invention relates to an improved method for preparing N-acyl-p-amino phenols. More particularly, this invention relates to a method for producing high yields of light colored N-acylated p-amino phenols.

In the past few years a new class of non-volatile antioxidants for petroleum products, greases, synthetic lubricants, plastic rubbers, resins, etc. has been developed. The materials may be called acylated p-amino phenols as a general class. The acyl-p-amino phenols, particularly the very low molecular weight members such as N-acetyl-p-amino phenol have also been found useful as a "short stop" in emulsion polymerization systems, for example, the formation of GR-S rubbers, polybutadiene, polyisoprene, etc. and as an analgesic additive in aspirin.

The acyl p-amino phenols are generally prepared by a condensation reaction which comprises heating a monocarboxylic acid or its anhydride in the presence of an entraining solvent such as benzene, toluene, xylene and the like, with para amino phenol. The solid reaction product is then dehydrated by evaporation. The present invention follows this general method of preparing N-acylated p-amino phenols but is directed toward the improvement of such condensation technique.

One of the major problems with the above preparation is the color noted in the resulting N-acylated p-amino phenol product. Whatever the cause, this coloration is particularly undesirable inasmuch as the N-acylated p-amino phenols are widely used in clear, colorless materials such as resins, plastics and the like and as analgesic additives in aspirins which require a high degree of purity. Accordingly, to eliminate the undesirable color, various methods of recrystallization, distillation and solvent extraction have been employed with varying degrees of success. But even where successful in producing a pure product such methods are time consuming and costly. It has also been proposed in Patent No. 2,799,692 to Croxall et al. to eliminate this undesirable color by carrying out the condensation of the reactants in accordance with the generally employed method but blanketing the reactants in an atmosphere of sulfur dioxide. Although this method produces a pure product, the yield obtained and the bulk density of the final product leave much to be desired.

It has now been found that light colored N-acylated p-amino phenols can be obtained in unexpectedly high yields, compared with those in the Croxall et al patent, by effecting the condensation of the p-amino phenol and a monocarboxylic acid in an atmosphere of hydrogen. It has also been discovered that the final product resulting from the process of the present invention has a higher density than products obtained by prior art methods. The advantages of a product of increased density are, of course, that it lowers bulk and therefore reduces shipping costs, that it makes available the use of more different and less expensive types of filtering devices and that it increases the filtration rate. As will be illustrated below, a condenstaion method wherein the p-amino phenol and acid reactants are blanketed in an atmosphere of hydrogen produces surprising yield and density advantages over a silmilar condensation method disclosed in the Croxall et al. Patent No. 2,799,692 wherein the reactants are blanketed in an atmosphere of sulfur dioxide.

The method of the present invention is conducted in the presence of a catalytic amount of a boron-containing compound. The boron-containing compound can be an inorganic compound such as boric acid, boron trioxide, metaboric acid, or other boron trioxide-yielding materials or it can be an organic boron compound. Suitable organic compounds, for instance, include those having the following general formulas:

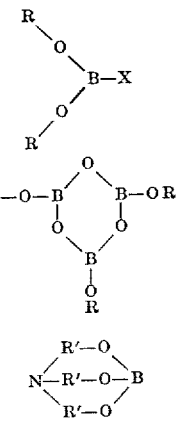

and wherein R is hydrogen or a monovalent hydrocarbon radical, including substituted hydrocarbon radicals such as an oxygen-containing radical, e.g. ester radical, etc., of up to about 20 or 24 carbon atoms, preferably 1 to 6 carbon atoms, R' is a divalent aliphatic hydrocarbon radical of up to 6 carbon atoms, preferably 2 to 4, and X is —OR or R. R can be a straight or branch chained aliphatic including cycloaliphatic radical, an aryl group, e.g. phenyl or a mixed alkyl-aryl radical, but preferably is an alkyl radical, and R and R' can be substituted with non-interfering groups. At least one of the R groups in the above general formulae is other than hydrogen. Examples of boron-containing organic compounds that may be employed are the aryl boronic acids, alkyl boric acids, trialkyl borates, trialkanol amine borates, trialkoxyboroximes, aryl dialkyl borates, etc. The alkyl groups in these compounds preferably contain 1 to 6 carbon atoms.

Boric acid, boric trioxide and metaboric acid are commercially available and can be obtained, for example, from the United States Borax and Chemical Corporation. Boron trioxide is an amorphous, anhydrous solid made by heating boric acid. The ordinary vitreous form of boron trioxide has no definite melting point. It begins to soften at about 325° C. (617° F.) and is fully fluid and pourable at about 500° C. (932° F.). It has a molecular weight of 69.6, a specific gravity at 12° C. of 1.795 and a heat of solution of 188.7 (B.t.u. per pound). Metaboric acid is generally obtained from boron trioxide and is available in three crystalline forms; one melting at 176° C., another melting at 201° C. and the third melting at 236° C. Metaboric acid melting at 176° C. is easily formed by quickly cooling molten boron trioxide. Metaboric acid melting at 201° C. is the most stable form and is obtained by remelting the metaboric acid form melting at 176° C. and cooling slowly. Metaboric acid of 236° C. melting point is formed at high temperatures and is very insoluble. The preparation of these forms of metaboric acid is described in Kemp, P. H., The Chemistry of Borates, part I, chapter 3, pp. 9–11, Borax Consolidated Limited, London (52). The preferred inorganic boron-containing catalysts for the purpose of this invention are boron trioxide and the metaboric acid form having a 201° C. melting point. The catalysts of the present invention are generally utilized in catalytic amounts of up to about 5 weight percent based on the combined weight of the reactants and entraining solvents and preferably in an amount of about 1 to 2 weight percent. The reaction temperature is normally up to about 200° C., preferably about 100 to 175° C.

In the practice of this invention, as in the prior art, the monocarboxilic acids having 2 to 21, preferably 12 to 18, carbon atoms are generally employed as the acid reactant. When the higher fatty acids containing upwards of 4 carbon atoms are used as the acid reactant, the corresponding N-acylated p-amino phenols possess greater solubility and therefore wider application as antioxidant additives in the various organic compositions that tend to gradually oxidize in storage. However, it will be appreciated that the exact nature of the acyl substituent does not effect the condensation of the acid with the amine. Oxoacids and branched acids are less desirable from a reaction rate standpoint. In selecting the p-amino phenol substituent either the unsubstituted p-amino phenol or the nuclear substituted p-amino phenols are suitable reactants within the scope of this invention as are the substituted monocarboxylic acids.

The following examples will illustrate the novel effects of the use of a hydrogen atmosphere according to this invention.

Example I below was run under the same conditions as given in Example I of Patent No. 2,799,692. All the results listed in Example I of the patent were checked with the results of the run and were found to be accurate.

EXAMPLE I

A two-liter reaction flask was equipped with an anchor-type glass agitator, a Dean-Starke water trap carrying a condenser, a thermometer and a gas inlet tube for maintaining an atmosphere of $SO_2$ above the surface of the reaction mixture. The flask was charged with 109 g. (1.0 mole) of p-amino phenol, 200 g. of coconut fatty acid which was a mixture of $C_{10}$, $C_{12}$, $C_{14}$ and $C_{16}$ fatty acids with lauric ($C_{12}$) acid predominating (the mixture having an acid number of 246.0 and a molecular weight of 228.0), 72 g. of toluene and 3.8 g. of powdered boric acid catalyst. The leg of the Dean-Starke trap was filled with 20 ml. of toluene and heating and agitation were started. A slow stream of sulfur dioxide was passed over the surface of the reactants. The charge was heated at 135–140° C., water being removed fairly rapidly at the beginning and more slowly as the reaction proceeded. A total of 18.5 ml. of water was collected in six hours.

The toluene was distilled at reduced pressure (15–20 mm.) and a maximum final temperature of 145° C. The residual melt was cooled slightly, and dissolved by adding 500 g. of 88% isopropanol. This solution was treated with 10 g. of activated powdered charcoal for 2½ hours at reflux; and filtered while still hot. An atmosphere of $SO_2$ was maintained throughout these operations. The charcoal coke was washed twice with 44 g. portions of hot 100% isopropanol. The filtrate and washings were transferred to a clean two-liter resin flask and diluted with 200 ml. of hot water. With agitation and gradual cooling under a continuous atmosphere of $SO_2$, the product was allowed to precipitate. At 58° C., the dropwise addition of 532 ml. of water was begun, being completed in about one hour. Cooling was applied by means of an ice-bath, the temperature of the mass falling to 15° C.

The supply of sulfur dioxide was then shut off and the product collected on a 5-inch centrifuge and washed with 50% by volume of cold aqueous isopropanol. The material was dried to constant weight in an oven at 60–75°. There was obtained 242 g. (83.2% of theory based on p-amino phenol), of a white powder having a melting point of 124–125° C. and a density (weight per 100 cc. of dry crystals) of 12.3 grams.

EXAMPLE II

Example I was conducted except that 3.8 grams of metaboric acid ($HBO_2$) of 176° C. melting point was employed as the catalyst instead of 3.8 grams of boric acid. The result was a yield of white powder of 98.7% of theory based on the para amino phenol which powder had a melting point of 124–125° C. and a density (weight per 100 cc. dry crystals) of 12.9 grams. The speed of the reaction was about 30% faster than the reaction in Example I. No ammonia was given off as a by-product during the reaction between the acid and p-amino phenol and the filtration rate on the product was rapid.

EXAMPLE III

Example II was conducted except that the form of metaboric acid having a melting point of 201° C. was used as a catalyst. This form of metaboric acid yielded a white powder of 86.2% of theory based on p-amino phenol which powder had a melting point of 124–125° C. and a density of 12.9 grams. The speed of reaction was about 20% faster than Example I.

EXAMPLE IV

Example II was again conducted but using as a catalyst the form of metaboric acid having a melting point of 236° C. This form of catalyst yielded a white powder of 84.6% of theory based on p-amino phenol which white powder had a melting point of 124–125° C. and a density of 12.6 grams. The reaction rate was about 5% faster than Example I.

EXAMPLE V

Example I was conducted using 3.8 grams of 100 mesh anhydrous boron oxide ($B_2O_3$) as a catalyst instead of 3.8 grams or boric acid. A yield of white powder of 98.2% of theory based on p-amino phenol, was obtained. The powder had a melting point of 124–125° C. and a density of 12.8 grams.

The following examples are given to illustrate the advantages of using a blanket of hydrogen instead of sulfur dioxide.

EXAMPLE VI

Example I above was conducted employing $H_2$ instead of sulfur dioxide. A yield of a very white powder of 89.3% of theory based on p-amino phenol was obtained. The product had a melting point of 124–125° C., a density (weight per 100 cc. dry crystals) of 17.8 grams and exhibited a Gardner Pigment Reflection No. of 97.

EXAMPLE VII

Example II above was conducted using an atmosphere of hydrogen instead of sulfur dioxide. A yield of a very white powder of 92.8% of theory based on p-amino phenol was obtained. The product had a melting point of 124–125° C., a density of (weight per 100 cc. dry crystals) of 18.3 grams and exhibited a Gardner Pigment Reflection No. of 97.

EXAMPLE VIII

Example II above was conducted using an atmosphere of hydrogen instead of sulfur dioxide. A yield of white powder of 96.3% of theory based on p-amino phenol was obtained. The powder had a melting point of 124–125° C. and a density (weight per 100 cc. of dry crystals) of 18.5 grams.

EXAMPLE IX

Example IV above was conducted using an atmosphere of hydrogen instead of sulfur dioxide. The results were a yield of white powder of 88.1% of theory based on p-amino phenol, having a melting point of 124–125° C. and a density of 19.2 grams.

EXAMPLE X

Example V above was conducted using an atmosphere of hydrogen instead of sulfur dioxide.

A yield of white powder of 99.3% of theory based on p-amino phenol was obtained. The product had a melting point of 124–125° C. and a density of 19.8 grams (weight per 100 cc. dry crystals).

A summary of the results of Examples I to X is shown in Table I below:

Table I

| Example | Catalyst | Procedure | Run time, hours | Yield, percent | Weight catalyst, g. | M.P. of product, °C. | Weight per 100 cc. crystals, dry,[1] g. |
|---|---|---|---|---|---|---|---|
| I in SO₂ gas | H₃BO₃ | Ex. I, U.S.P. 2,799,692 | 6 | 83.4 | 3.8 | 124-125 | 12.3 |
| II in SO₂ gas | HBO₂ with M.P. 176° C | do | 6 | 97.8 | 3.8 | 124-125 | 12.9 |
| III in SO₂ gas | HBO₂ with M.P. 201° C | do | 6 | 86.2 | 3.8 | 124-125 | 12.9 |
| IV in SO₂ gas | HBO₂ with M.P. 236° C | do | 6 | 84.6 | 3.8 | 124-125 | 12.6 |
| V in SO₂ gas | B₂O₃ | do | 6 | 98.2 | 3.8 | 124-125 | 12.8 |
| VI in H₂ gas | H₃BO₃ | do | 6 | 89.3 | 3.8 | 124-125 | 17.8 |
| VII in H₂ gas | HBO₂ with M.P. 176° C | do | 6 | 92.8 | 3.8 | 124-125 | 18.3 |
| VIII in H₂ gas | HBO₂ with M.P. 201° C | do | 6 | 96.3 | 3.8 | 124-125 | 18.5 |
| IX in H₂ gas | HBO₂ with M.P. 236° C | do | 6 | 88.1 | 3.8 | 124-125 | 19.2 |
| X in H₂ gas | B₂O₃ | do | 6 | 99.3 | 3.8 | 124-125 | 19.8 |

[1] Tests made without tapping vessel holding crystals.

Examination of the above results clearly shows the advantages of employing an atmosphere of molecular hydrogen during the N-acylation of a p-amino phenol. In

EXAMPLE XI

Example I above was conducted employing hydrogen and the boron-containing organic compounds indicated in Table II below as catalysts. The results are also shown in Table II below.

Table II

| Catalyst | Catalyst weight, g. | Inert atmos. | H₂O eliminated at reaction time of— | | | | | Density, g./100 cc. |
|---|---|---|---|---|---|---|---|---|
| | | | 2 hrs. | 3 hrs. | 4 hrs. | 5 hrs. | 6 hrs. | |
| None | 0.0 | | 2.5 | 4.75 | 6.5 | 7.75 | 8.5 | |
| Tribenzyl borate 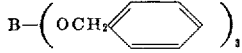 | 3.8 | Hydrogen | 6.5 to 7.0 | 11.5 | 13.25 | | 15.0 | |
| Trimethoxyboroxime 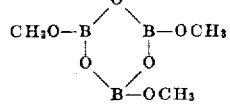 | 3.8 | do | 8.0 | 13.25 | 14.5 | 15.5 | | |
| Triethanolamine borate 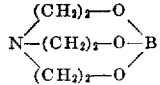 | [1] 3.8 | do | 3.0 | 5.5 | 8.0 | 9.5 | 10.5 | 43.5 |
| 2,6-di-tert-butyl-4-methylphenyl-di-n-butyl borate 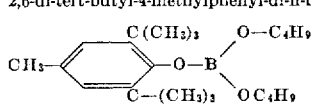 | 10.0 | do | 8.5 | 11.5 | 14.0 | 15.25 | | |
| Tri-n-butylborate (B—(OC₄H₉)₃) | 3.8 | do | 7.0 | 10.5 | 13.0 | 14.2 | 14.5 | 44.8 |
| Tri-n-propyl borate (B—(OC₃H₇)₃) | 3.8 | do | 8.0 | 11.25 | 13.3 | 14.5 | 15.0 | |
| Tris-[3-(2,2,4-trimethylpentyl-iso-butyrate)] borate 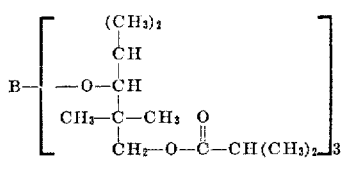 | 3.8 | do | 9.0 | 10.5 | 12.3 | 13.4 | 13.8 | 38.0 |

[1] Sublimed readily from reaction mixture, during reaction, reducing catalyst in vessel.

all cases, not only was a product of greater yield obtained than produced in the process of the Croxall et al. Patent No. 2,799,692 but the product also exhibited an unexpectedly advantageous increase in density. Moreover, this increase in density of from about 5.0 to 7.5 grams per 100 cc. of dry crystal when an atmosphere of hydrogen was used, occurred regardless of the catalyst employed. Also illustrated is the fact that the most advantageous results are obtained when the reaction is carried out in an atmosphere of hydrogen and in the presence of boron trioxide or metaboric acid of 201° C. melting point as a catalyst.

Examination of the data of Table II clearly shows the advantages of employing an atmosphere of hydrogen during the N-acylation of a para amino phenol in the presence of boron-containing organic compounds. The density determinations of the products shown in Table II differed from the density determinations of the products produced in Examples I through X in that prior to making the density determination in the tests of Table II, the sample vessel was tapped several times whereas in Examples I through X there was no tapping of the sample. For a comparison, a density determination of a product obtained by the method of Example I was made by the tapping method and a density of 20.0 grams/100 cc. was obtained in contrast to the 14.0 grams/100 cc. density when no tapping was employed. Thus the increase in density obtained in the product by the method of the present invention is clear, regardless of the technique employed to determine the density.

This application is a continuation-in-part of parent application Serial No. 769,278, filed October 24, 1958.

It is claimed:

1. In the N-acylation of p-amino phenol by condensation with a monocarboxylic acid of 2 to 21 carbon atoms in the presence of a catalytic amount of a boron-containing catalyst, the improvement which comprises maintaining the reaction mixture of p-amino phenol and monocarboxylic acid in an atmosphere of hydrogen during the acylation.

2. The method of claim 1 wherein the boron-containing compound is boron trioxide.

3. The method of claim 1 wherein the boron-containing compound is metaboric acid having a melting point of 201° C.

No references cited.

UNITED STATES PATENT OFFICE
CERTIFICATE OF CORRECTION

Patent No. 3,081,321 March 12, 1963

David W. Young

It is hereby certified that error appears in the above numbered patent requiring correction and that the said Letters Patent should read as corrected below.

Column 4, line 55, for "II" read -- III --.

Signed and sealed this 7th day of January 1964.

(SEAL)
Attest:
ERNEST W. SWIDER

EDWIN L. REYNOLDS

Attesting Officer

Acting Commissioner of Patents